United States Patent
Ito

(10) Patent No.: US 7,172,301 B2
(45) Date of Patent: Feb. 6, 2007

(54) OPTICAL REFLECTING MIRROR

(75) Inventor: Eiji Ito, Saitama (JP)

(73) Assignee: Fujinon Corporation, Saitama (JP)

( * ) Notice: Subject to any disclaimer, the term of this patent is extended or adjusted under 35 U.S.C. 154(b) by 0 days.

(21) Appl. No.: 10/838,403

(22) Filed: May 3, 2004

(65) Prior Publication Data

US 2004/0228017 A1    Nov. 18, 2004

(30) Foreign Application Priority Data

May 13, 2003    (JP)    ............................. 2003-134582

(51) Int. Cl.
*G02B 5/10*    (2006.01)
(52) U.S. Cl. ...................... 359/868; 359/838
(58) Field of Classification Search ................ 359/868, 359/871, 864, 866, 869, 838; 264/478; 156/500
See application file for complete search history.

(56) References Cited

U.S. PATENT DOCUMENTS

| | | | | |
|---|---|---|---|---|
| 3,764,201 A | * | 10/1973 | Haile ........................... | 359/864 |
| 4,264,144 A | * | 4/1981 | McCord ....................... | 359/868 |
| 4,436,372 A | * | 3/1984 | Schmidt et al. ............. | 359/868 |
| 4,730,914 A | * | 3/1988 | Stout ........................... | 359/868 |
| 4,822,157 A | * | 4/1989 | Stout ........................... | 359/868 |
| 4,938,578 A | * | 7/1990 | Schmidt et al. ............. | 359/868 |
| 5,084,785 A | * | 1/1992 | Albers et al. ................ | 359/868 |
| 5,307,211 A | * | 4/1994 | Schmidt et al. ............. | 359/868 |
| 5,329,406 A | * | 7/1994 | Nakanishi et al. .......... | 359/811 |
| 5,549,855 A | * | 8/1996 | Nakanishi et al. .......... | 264/2.5 |
| 5,589,984 A | * | 12/1996 | Schmidt et al. ............. | 359/603 |
| 5,668,656 A | * | 9/1997 | Fujinawa et al. ........... | 359/208 |
| 5,712,719 A | * | 1/1998 | Hama ........................... | 359/207 |
| 6,144,505 A | * | 11/2000 | Nakanishi et al. .......... | 359/811 |

FOREIGN PATENT DOCUMENTS

| | | |
|---|---|---|
| JP | 9-155928 | 6/1997 |
| JP | 2003-134028 | 5/2003 |

* cited by examiner

*Primary Examiner*—Ricky D. Shafer
(74) *Attorney, Agent, or Firm*—Jordan and Hamburg LLP

(57) ABSTRACT

For an optical reflecting mirror formed by applying injection molding to a plastic material, it is an object of the present invention to suppress warpage or distortion due to molding contraction and provide an optical reflecting mirror such as an axial eccentric a spherical mirror or free curved surface mirror with a highly accurate mirror surface, which is an axial eccentric a spherical mirror or free curved surface mirror formed by applying injection molding to a plastic material, including a rib connected in such a way as to intersect with the body having the mirror surface, formed at least at the outer edge of the mirror surface closest to the maximum curvature part within the mirror surface.

6 Claims, 6 Drawing Sheets

$t_1 = t_2 = t_3$

CROSS SECTION ALONG LINE D-D

CROSS SECTION ALONG LINE A-A

CROSS SECTION ALONG LINE B-B

CROSS SECTION ALONG LINE C-C

CROSS SECTION ALONG LINE D-D

CROSS SECTION ALONG LINE A-A

CROSS SECTION ALONG LINE B-B

CROSS SECTION ALONG LINE C-C

CROSS SECTION
ALONG LINE D-D

CROSS SECTION
ALONG LINE A-A

CROSS SECTION
ALONG LINE B-B

CROSS SECTION
ALONG LINE C-C

OPTICAL REFLECTING MIRROR

BACKGROUND OF THE INVENTION

1. Field of the Invention

The present invention relates to an optical reflecting mirror such as an axial eccentric a spherical mirror and free curved surface mirror.

2. Description of the Related Art

Conventional optical reflecting mirrors having a curved reflecting surface, which is difficult to manufacture from glass, are formed by applying injection molding to a plastic material. However, molding using an injection molding method produces sinks, warpage, distortion, etc., on the optical reflecting mirror due to molding contraction, resulting in deteriorated accuracy of the mirror surface.

In molding using normal injection molding, the thickness from a mirror surface 100 to the back surface 101 partially varies as shown in FIG. 1(a), the molding contraction increases as the thickness increases, and it is therefore difficult to improve the accuracy of the mirror surface 100.

With regard to a method for forming an optical reflecting mirror whose thickness partially varies through injection molding, there is a proposal on a method (Japanese Patent Laid-Open No. H9-155928) which molds an optical reflecting mirror shaped in such a way as to connect a body having a mirror surface and a rib which intersects with this body through resin injection into a molding die, places a gate at a position facing the rib and preferentially sinks the rib while cooling and keeping the pressure of the resin so that sinks on the mirror surface can be suppressed and the mirror surface can be formed with a high degree of accuracy.

That is, this method is intended to complement the amount of contraction of the body having the mirror surface by sinking the side of the rib and prevent sinks from occurring on the mirror surface of the optical reflecting mirror.

However, the method described in Japanese Patent Laid-Open No. H9-155928 seems to be unable to form the mirror surface of an optical reflecting mirror having a complicated surface shape used for a projector (e.g., axial eccentric a spherical mirror and free curved surface mirror) with a high degree of accuracy.

On the other hand, the present inventor proposes a method for forming an optical reflecting mirror having a complicated surface shape such as an axial eccentric a spherical mirror and free curved surface mirror, capable of suppressing sinks on a mirror surface 100' shown in FIG. 1(b) by equalizing the overall thickness from the mirror surface 100' to the back surface 101' ($t_1=t_2=t_3$) and equalizing the overall amount of contraction (Japanese Patent Application No. 2003-134028).

However, while the conventional art can prevent sinks on the optical reflecting mirror, when an optical reflecting mirror having a mirror surface with nonuniform curvature such as an axial eccentric a spherical mirror and free curved surface mirror is formed through injection molding, there is a possibility of warpage or distortion occurring due to the shape of the mirror surface (difference in curvature). That is, the optical reflecting mirror having nonuniform curvature of the mirror surface has a nonuniform sum total of vectors of the amount of contraction, causing warpage or distortion on the mirror surface and making it difficult to form a high accuracy mirror surface.

SUMMARY OF THE INVENTION

Therefore, it is an object of the present invention to provide an optical reflecting mirror designed to improve the accuracy of the mirror surface having a complicated curved shape used for a projector, etc.

In order to attain the above described object, for an axial eccentric a spherical mirror or free curved surface mirror formed by applying injection molding to a plastic material, the present invention involves forming of a rib which is connected in such a way as to intersect with a body having a mirror surface at least at the outer edge of the mirror surface closest to the maximum curvature part within the mirror surface.

The optical reflecting mirror of the present invention strengthens (reinforces) the resistance to a deforming force during molding contraction, and can thereby suppress warpage or distortion of the mirror surface. That is, the present invention can improve the accuracy of the mirror surface of an optical reflecting mirror having a mirror surface of complicated curved shape such as an axial eccentric a spherical mirror or free curved surface mirror.

DETAILED DESCRIPTION OF THE PREFERRED EMBODIMENTS

Figure 1A:
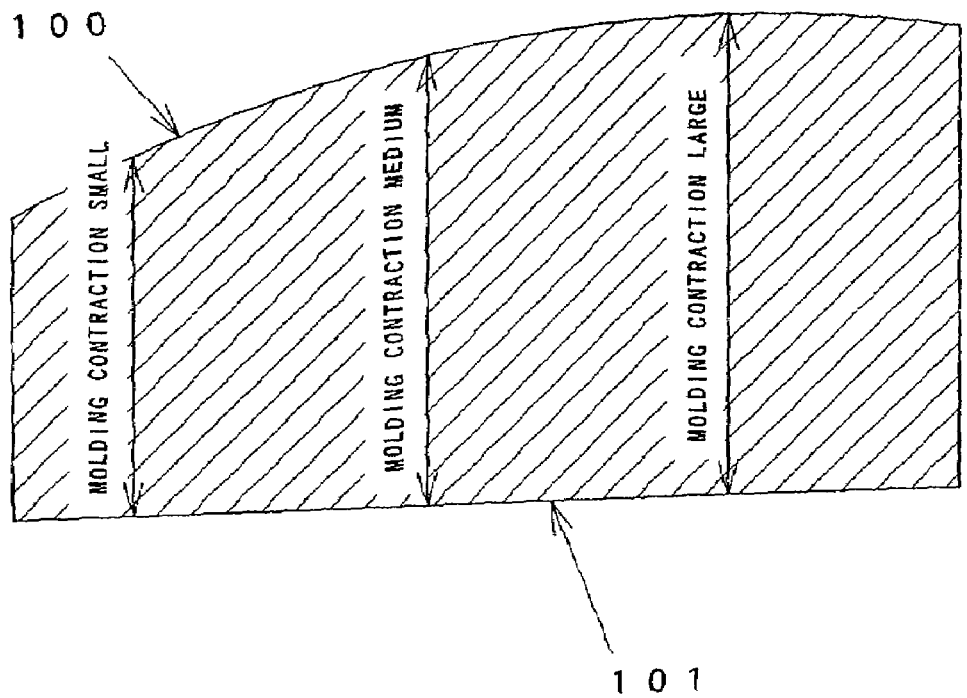
FIGS. 1(a) and 1(b) illustrate an optical reflecting mirror according to a conventional technology.
Figure 1B:
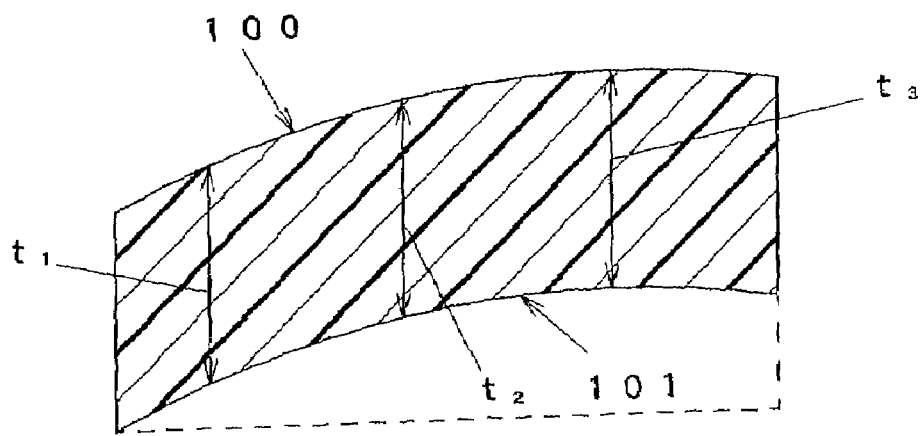

With reference now to the attached drawings, embodiments of the present invention will be described below.

The present invention involves forming of a rib 4 at the outer edge of the mirror surface (outside the effective surface) of an optical reflecting mirror such as an axial eccentric a spherical mirror or free curved surface mirror having a mirror surface (effective surface) 2 with the curvature of the surface shape of which is not uniform.

The axial eccentric a spherical mirror refers to a mirror whose mirror surface (effective surface) 2 consists of a portion cut out from an a spherical mirror, which is symmetric with respect to the axis of rotation and a curved section with no rotation axis on the mirror surface 2.

The free curved surface mirror refers to a mirror with the mirror surface (effective surface) 2 including a curved section such as a free curves surface, a spherical surface, paraboloid, etc.

Note that the term "having a curved section" means that the mirror surface may include a partially flat section or may also have an entirely curved surface.

An optical reflecting mirror according to a first embodiment will be described with reference to FIG. 2.

The optical reflecting mirror shown in FIG. 2 is an axial eccentric a spherical mirror having of a body 1 having a mirror surface 2 and a rib 4a connected in such a way as to intersect with the body 1, and the mirror surface (effective surface) 2 formed on the surface of the body 1 includes a curved section cut out in a generally rectangular form from an a spherical mirror, which is symmetric with respect to the axis of rotation. In this case, the entire mirror surface 2 constitutes the curved section, a back surface 3 also has a concave/convex shape which is opposite to that of the mirror surface 2 and the thickness from the front surface 2 to back surface 3 is formed so as to be uniform.

Furthermore, the body 1 having the generally-rectangular mirror surface 2 is provided with the rib 4a connected in such a way as to intersect with the body 1 on one side at the outer edge of the mirror surface.

Figure 2A:
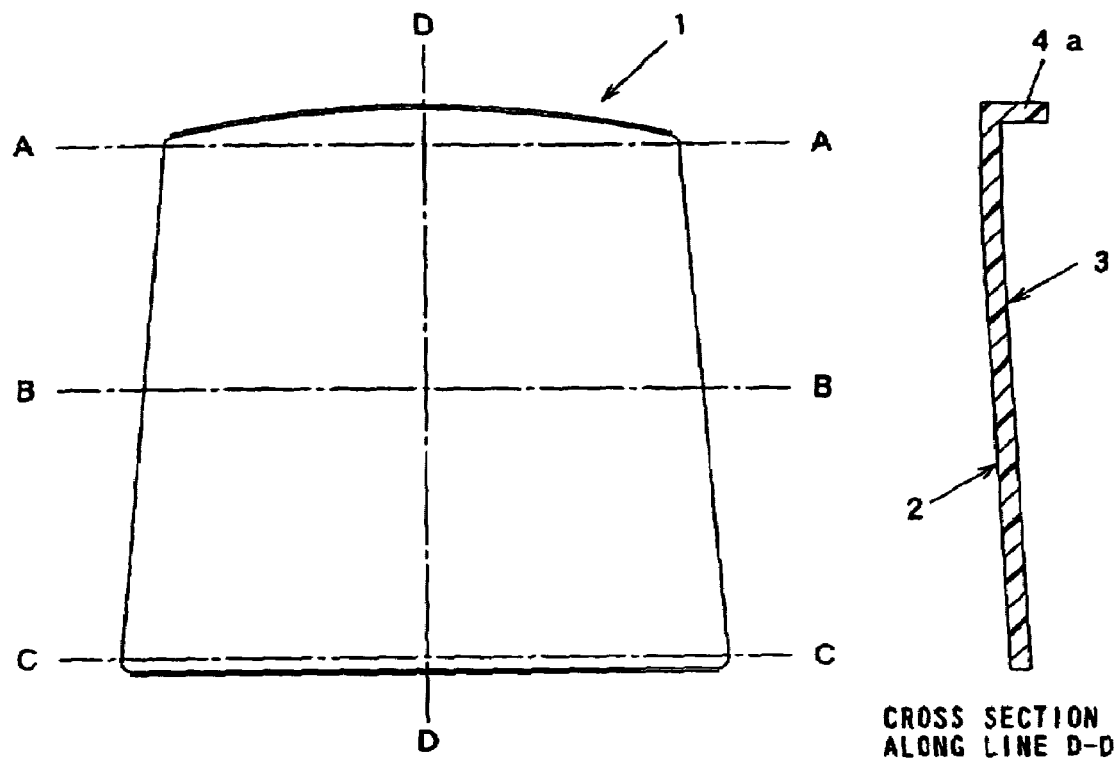
FIGS. 2(a) and 2(b) illustrate a first embodiment of an optical reflecting mirror according to the present invention.
Figure 2B:
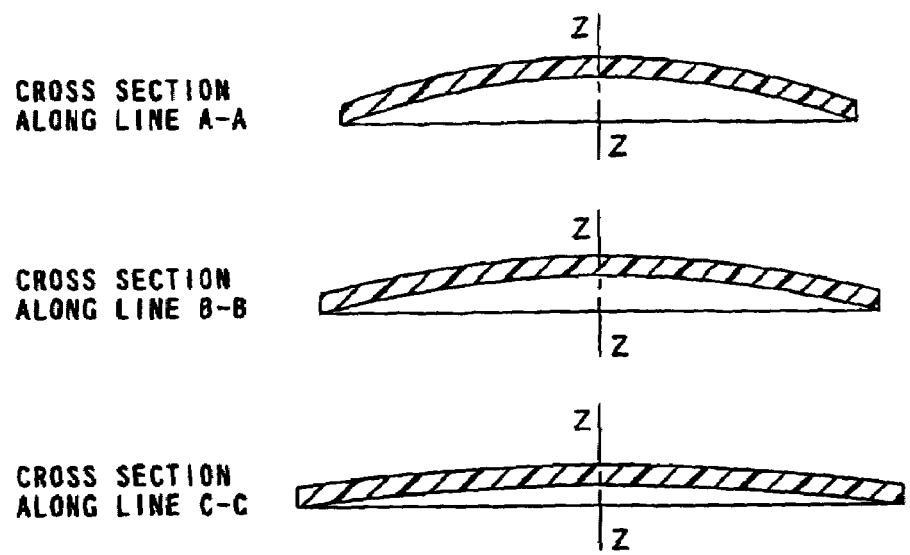

FIG. 2(a) shows a plan view and a cross-sectional view along a line D—D extend in the direction of a first axis along the optical reflecting surface of the minor of this embodiment. FIG. 2(b) shows a cross-sectional view along a line A—A, a crass-sectional view along a line B—B and a cross-sectional view along a line C—C of the optical reflecting minor, each of which extends in the direction of a second axis of the optical reflecting mirror that is perpendicular to the first axis and which tangentially contacts the reflective surface of the mirror. The figure also illustrates centerline Z—Z extending in the direction of a third axis which is perpendicular to the first and second axes and extent normal to the optical reflective surface of the mirror.

In the optical reflecting mirror of this embodiment, the maximum curvature part within the mirror surface (effective surface) 2 of the body 1 is close to the line A—A (see FIG. 2(b)), and forming the rib 4a at the outer edge of the mirror surface closest to the maximum curvature part (close to the line A—A) of this mirror surface 2 prevents warpage or distortion during molding contraction.

That is, an optical reflecting mirror comprising a body 1 having a mirror 2 of nonuniform curvature and a rib 4a formed at the outer edge of the mirror surface closest to the maximum curvature part within the mirror surface is molded through resin injection into a molding die, and in this way the optical reflecting mirror having the highly accurate mirror surface 2 is formed with warpage or distortion due to molding contraction prevented through the rib 4a connected to the body 1.

Then, an optical reflecting mirror according to a second embodiment will be described with reference to FIG. 3.

The optical reflecting mirror shown in FIG. 3 is an axial eccentric a spherical mirror having a body 1 having a mirror surface 2 and two ribs 4a and 4b connected in such a way as to intersect with this body 1, and the mirror surface (effective surface) 2 includes a curved section cut out in a generally rectangular form from an a spherical mirror, which is symmetric with respect to the axis of rotation. In this case, the entire mirror surface 2 is the curved section, a back surface 3 also has a concave/convex shape which is opposite to that of the mirror surface 2 and the thickness from the front surface 2 to back surface 3 is formed so as to be uniform.

Furthermore, the body 1 having the generally-rectangular mirror surface 2 is provided with the ribs 4a and 4b connected in such a way as to intersect with the body 1 on two facing sides at the outer edge of the mirror surface.

Figure 3A:
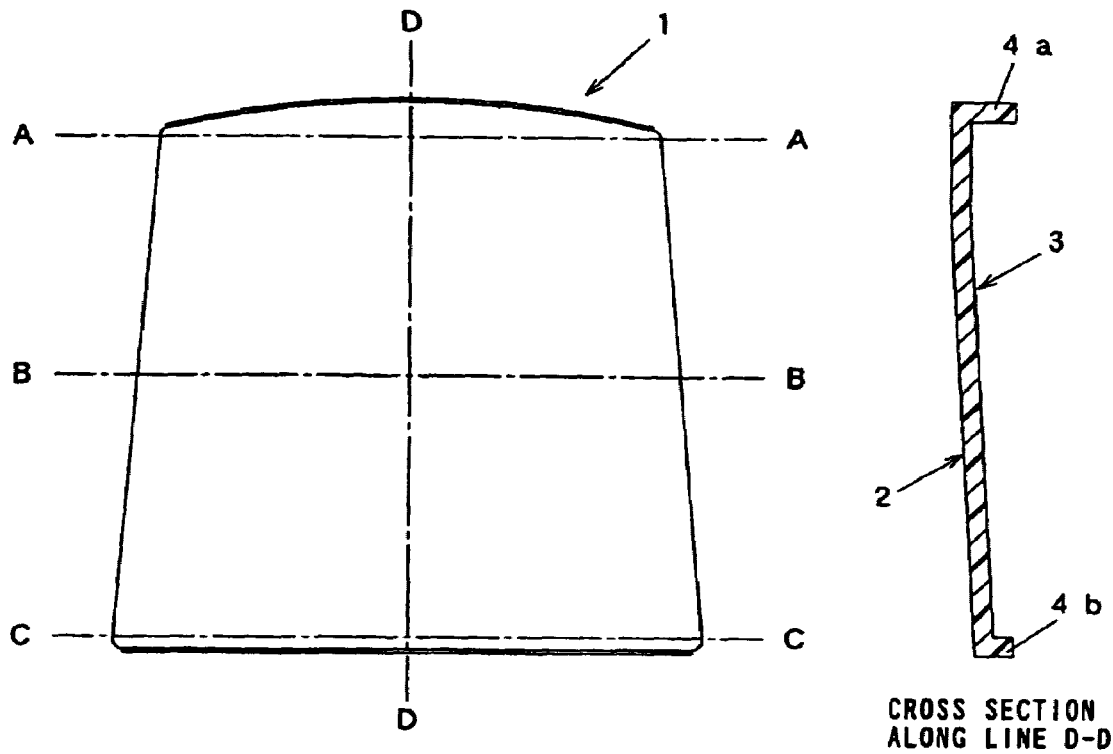
FIGS. 3(a) and 3(b) illustrate a second embodiment of an optical reflecting mirror according to the present invention.
Figure 3B:
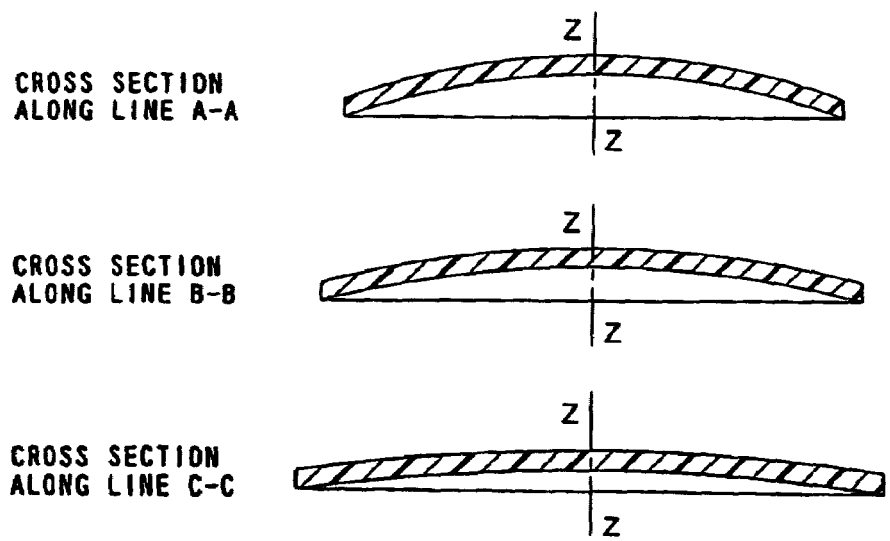

FIG. 3(a) shows a plan view and a cross-sectional view along a line D—D of the optical reflecting mirror of this embodiment and FIG. 3(b) shows a cross-sectional view along a line A—A, a cross-sectional view along a line B—B and a cross-sectional view along a line C—C of the optical reflecting mirror.

In the optical reflecting mirror of this embodiment, the maximum curvature part in the mirror surface (effective surface) 2 of the body 1 is close to the line A—A (see FIG. 3(b)), the rib 4a is formed at the outer edge of the mirror surface closest to the maximum curvature part (close to the line A—A) of this mirror surface 2 and the rib 4b is formed at the outer edge of the mirror surface opposite to the rib 4a (see the cross-sectional view along the line D—D) to thereby prevent warpage or distortion during molding contraction.

That is, an optical reflecting mirror comprising a body 1 having a mirror 2 of nonuniform curvature, a rib 4a formed at the outer edge of the mirror surface closest to the maximum curvature part within the mirror surface and a rib 4b formed at the outer edge of the mirror surface opposite to the rib 4a is molded through resin injection into a molding die, and in this way the optical reflecting mirror having the highly accurate mirror surface 2 is formed with warpage or distortion due to molding contraction prevented through the two ribs 4a and 4b connected to the body 1.

Then, an optical reflecting mirror according to a third embodiment will be described with reference to FIG. 4.

The optical reflecting mirror shown in FIG. 4 is an axial eccentric a spherical mirror having a body 1 having a mirror surface 2 and four ribs 4a, 4b, 4c and 4d connected in such a way as to intersect with this body 1 and the mirror surface (effective surface) 2 formed on the surface of the body 1 includes a curved section cut out from an a spherical mirror in a generally rectangular form, which is symmetric with respect to the axis of rotation. In this case, the entire mirror surface 2 is the curved section, a back surface 3 also has a concave/convex shape which is opposite to that of the mirror surface 2 and the thickness from the front surface 2 to back surface 3 is formed so as to be uniform.

Furthermore, the body 1 having the generally-rectangular mirror surface 2 is provided with the four ribs 4a, 4b, 4c and 4d connected in such a way as to intersect with this body 1 on the entire circumference (4 sides) of the mirror surface.

Figure 4A:
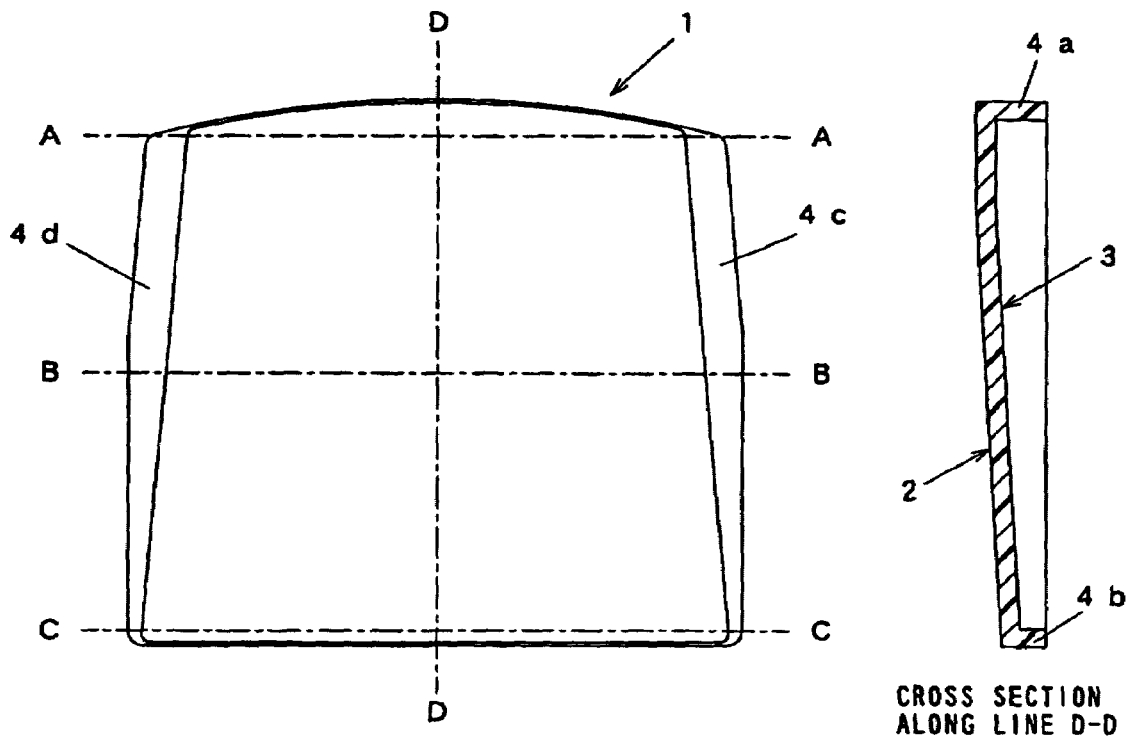
FIGS. 4(a) and 4(b) illustrate a third embodiment of an optical reflecting mirror according to the present invention.
Figure 4B:
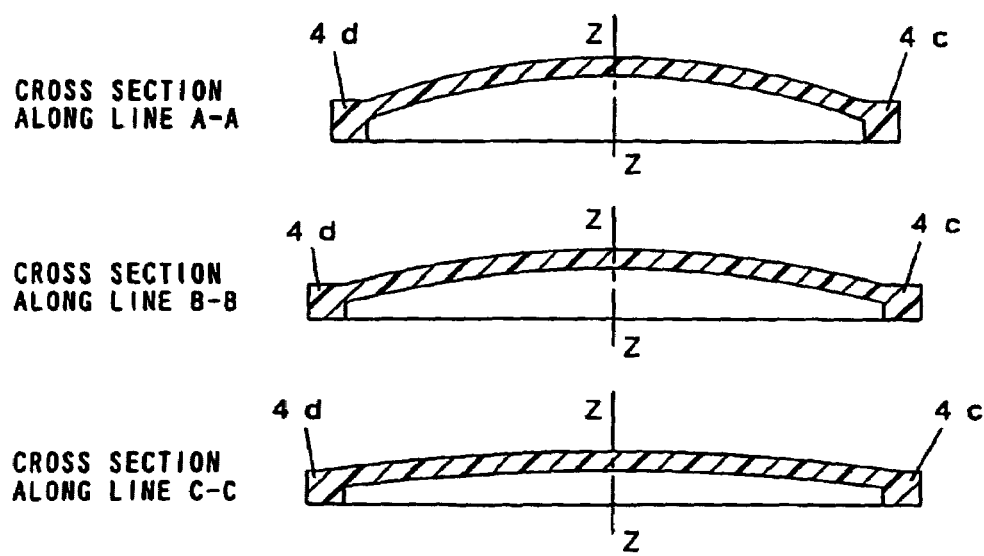

FIG. 4(a) shows a plan view and a cross-sectional view along a line D—D of the optical reflecting mirror of this embodiment and FIG. 4(b) shows a cross-sectional view along a line A—A, a cross-sectional view along a line B—B and a cross-sectional view along a line C—C of the optical reflecting mirror.

In the optical reflecting mirror of this embodiment, the maximum curvature part in the mirror surface (effective surface) 2 of the body 1 is close to the line A—A (see FIG. 4(b)), the rib 4a is formed at the outer edge of the mirror surface closest to the maximum curvature part (close to the line A—A) of this mirror surface 2, and the ribs 4b, 4c and 4d are formed at the outer edge (other 3 sides) of the mirror surface to thereby prevent warpage or distortion during molding contraction.

That is, an optical reflecting mirror comprising a body 1 having a mirror 2 of nonuniform curvature, ribs 4a, 4b, 4c and 4d formed on the entire circumference of the mirror surface is molded through resin injection into a molding die, and in this way the optical reflecting mirror having the highly accurate mirror surface 2 is formed with warpage or distortion due to molding contraction prevented through the four ribs 4a, 4b, 4c and 4d connected to the body 1.

Then, an optical reflecting mirror according to a fourth embodiment will be described with reference to FIG. 5.

The optical reflecting mirror shown in FIG. 5 is an axial eccentric a spherical mirror having a body 1 having a mirror surface 2 and a rib 4e connected in such a way as to intersect with this body 1 and the mirror surface (effective surface) 2 includes a curved section cut out from in a general circular form from an a spherical mirror, which is symmetric with respect to the axis of rotation. In this case, the entire mirror surface 2 is the curved section, a back surface 3 also has a concave/convex shape which is opposite to that of the mirror surface 2 and the thickness from the front surface 2 to back surface 3 is formed so as to be uniform.

Furthermore, the body 1 having the quasi-circular mirror surface 2 is provided with the rib 4e connected in such a way as to intersect with this body 1 on the entire circumference of the mirror surface.

Figure 5A:
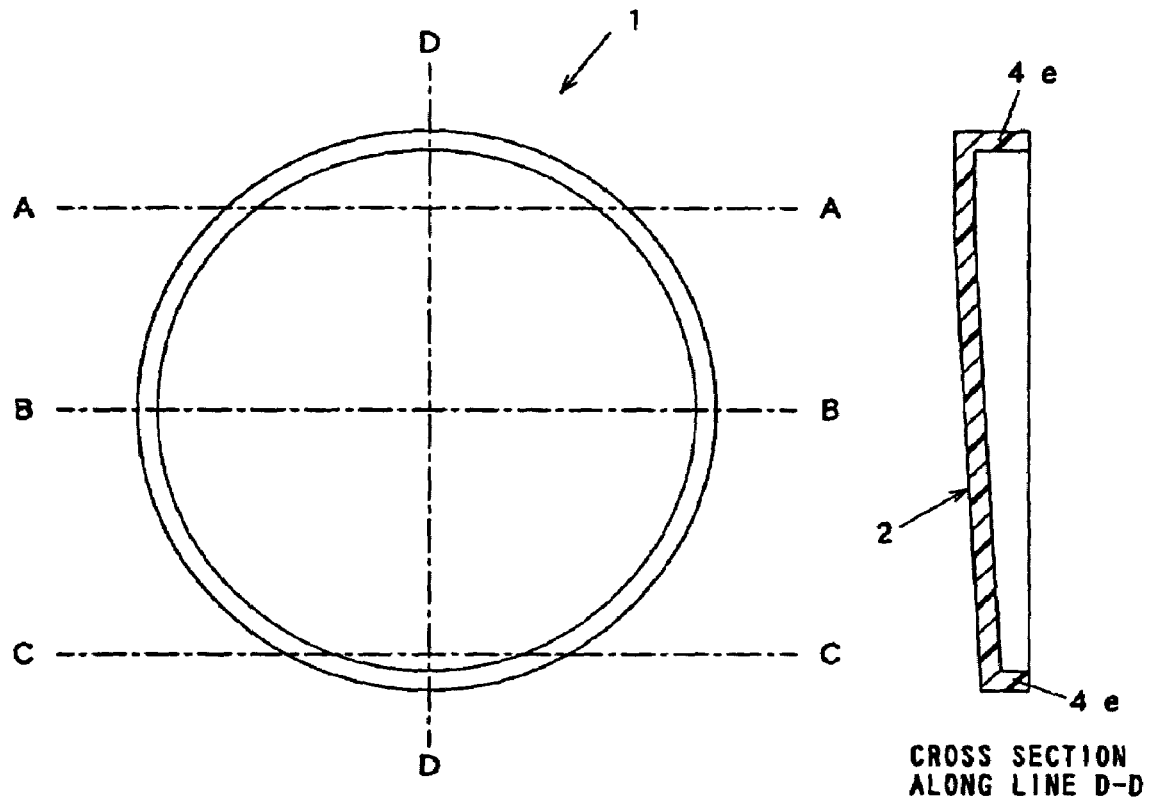
FIGS. 5(a) and 5(b) illustrate a fourth embodiment of an optical reflecting mirror according to the present invention.
Figure 5B:
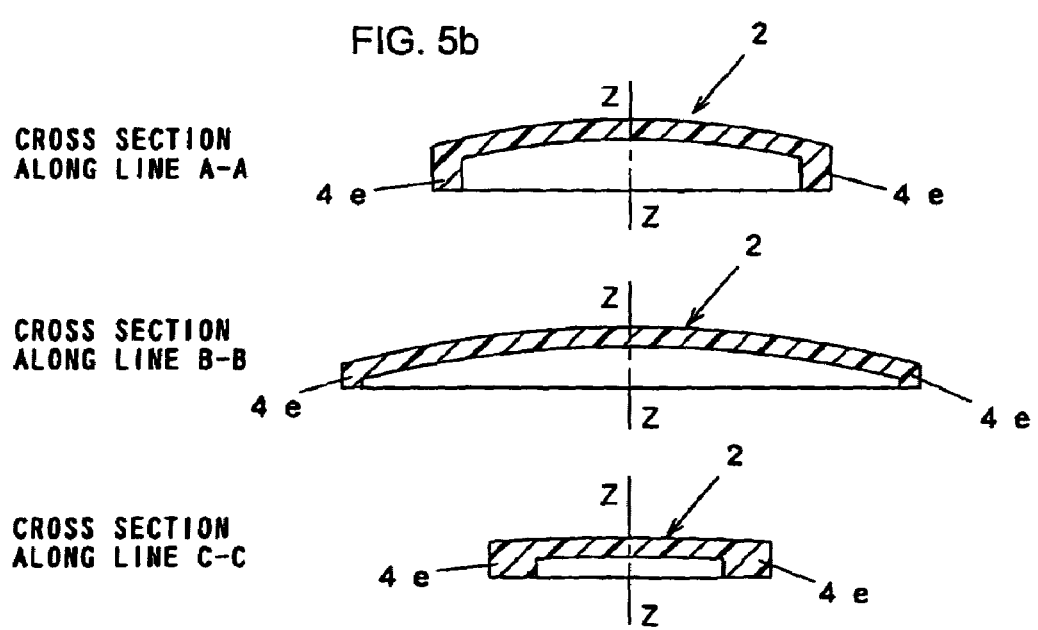

FIG. 5(a) shows a plan view and a cross-sectional view along a line D—D of the optical reflecting mirror of this embodiment and FIG. 5(b) shows a cross-sectional view along a line A—A, a cross-sectional view along a line B—B and a cross-sectional view along a line C—C of the optical reflecting mirror.

In the optical reflecting mirror of this embodiment, the rib 4e connected in such a way as to intersect with the body 1 having the quasi-circular mirror surface (effective surface) 2 is formed on the entire circumference of the mirror surface. That is, an optical reflecting mirror comprising a body 1 having a mirror 2 of nonuniform curvature and a rib 4e formed on the entire circumference of the mirror surface is molded through resin injection into the molding die, and in this way the optical reflecting mirror having the highly accurate mirror surface 2 is formed with warpage or distortion due to molding contraction prevented through the rib 4e connected to the body 1.

Note that the optical reflecting mirror in this embodiment, the maximum curvature part within the mirror surface (effective surface) 2 of the body 1 is close to the line A—A (see FIG. 5(b)) and it is possible to form the rib 4e only at the outer edge of the mirror surface closest to the maximum curvature part of the mirror surface 2 (close to the line A—A).

FIG. 6 shows an embodiment of a molding die apparatus for forming an optical reflecting mirror by applying injection molding to a plastic material.

The molding die apparatus 10 shown in FIG. 6 is a molding die apparatus for forming an optical reflecting mirror with a rib 4 formed at the outer edge of the mirror surface to suppress warpage and distortion of the mirror surface 2, comprising a surface molding die 12 provided with a mirror surface molding surface, a back surface molding die 13 provided with a back surface molding surface and a resin inlet 11 through which a plastic material is charged into a cavity between the surface molding die 12 and the back surface molding die 13.

Silver or aluminum is evaporated onto the surface of the injection-molded plastic (surface onto which a mirror surface molding surface is transferred), which is formed as a mirror surface 2. As the mirror forming means, various publicly known means can be adopted.

Figure 6A:
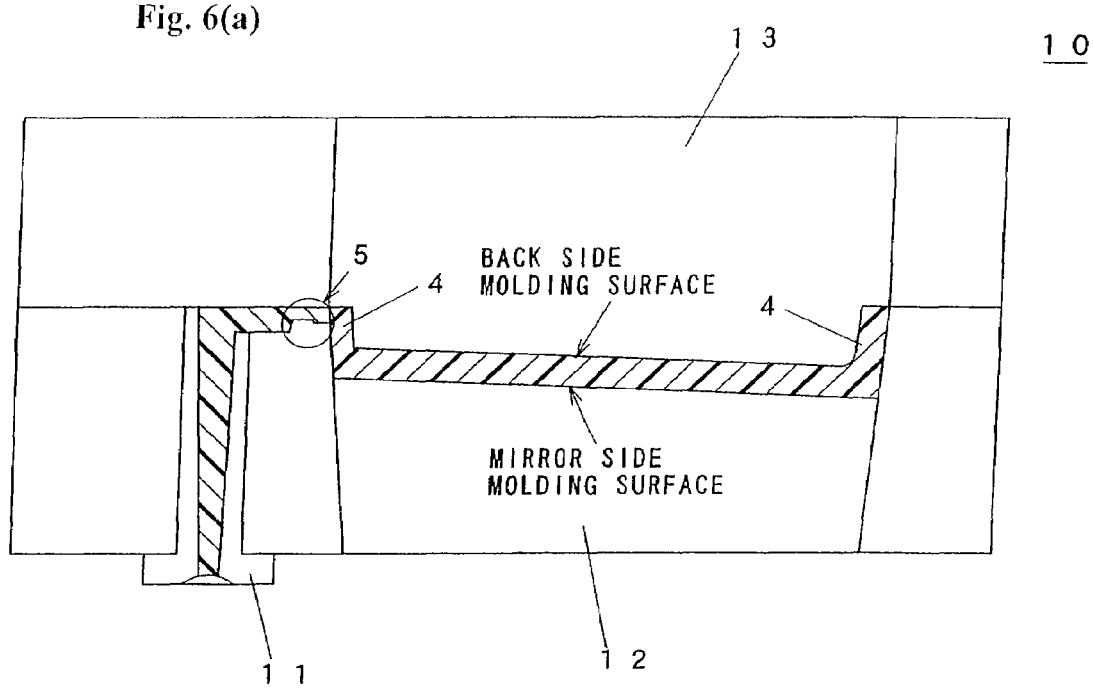
FIGS. 6(a) and 6(b) illustrate cross-sectional view of a molding die apparatus for manufacturing an optical reflecting mirror.
Figure 6B:
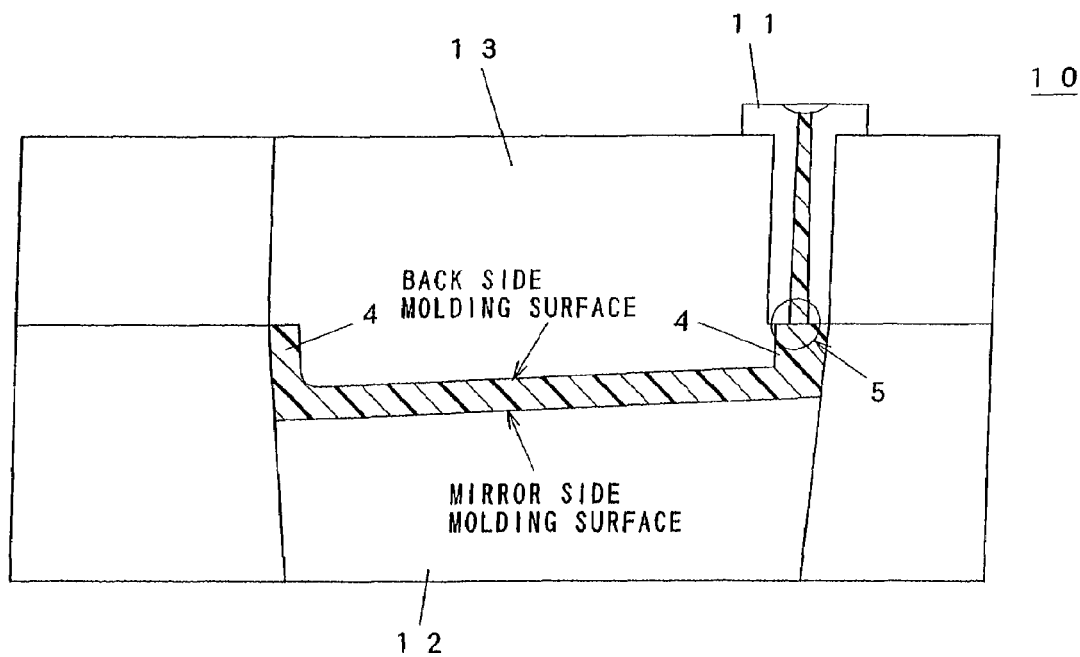

According to this embodiment, as shown in FIG. 6(a) and FIG. 6(b), the resin inlet 11 is placed in such a way that a gate 5 for when the plastic material is charged into the cavity is placed at a position apart from the mirror surface 2.

Since the molding accuracy is poor in the vicinity of the gate 5 into which the plastic material is charged, placing the resin inlet 11 in such a way that this gate 5 is placed at the position apart from the mirror surface 2 of the optical reflecting mirror makes it possible to form an optical reflecting mirror having the high accuracy mirror surface 2.

That is, this embodiment forms the optical reflecting mirror with the gate 5 formed at the position apart from the mirror surface 2. Then, this embodiment forms the gate 5 at the rib 4 in the position apart from the mirror 2 of the optical reflecting mirror for which the rib 4 is formed at the outer edge of the mirror surface to suppress warpage or distortion of the mirror surface 2.

What is claimed is:

1. An optical reflecting mirror comprising:
    a reflective surface defined by a predetermined section of a larger aspherical surface;
    said reflective surface comprising a nonuniform curvature;
    said reflective surface being symmetric about an axis of rotation, said axis of rotation being spaced from and not contacting said mirror, thereby said mirror further comprising:
        a plurality of axes including first, second and third axes, each of said axes being mutually perpendicular;
        said first axis extending along a reflecting surface of said mirror, said second axis extending tangential to the reflecting surface of said mirror and said third axis extending normal to the reflecting surface of said mirror;
        said first axis being oriented at an acute angle to said axis of rotation;
        a segment of an outer edge of said minor includes a greater curvature than a remaining outer edge of said mirror; and
    said mirror further comprising a rib extending along said outer edge of said mirror along said segment of greater curvature of said reflective surface, said rib extending in the direction of said third axis.

2. The optical reflecting mirror according to claim 1, wherein the rib is provided on the entire circumference of the mirror surface.

3. The optical reflecting mirror according to claim 1, wherein the overall thickness between the front and back surfaces of the body having the mirror surface is formed so as to be uniform or substantially uniform.

4. The optical reflecting mirror according to claim 1, wherein a gate is formed at a position apart from the mirror surface.

5. The optical reflecting mirror according to claim 1, wherein a gate is formed at the rib.

6. The mirror of claim 1 wherein the first axis is eccentric to the axis of rotation.

\* \* \* \* \*